Oct. 27, 1931.  W. J. WOODS  1,829,429
DRAWING GLASS
Filed April 9, 1929   4 Sheets-Sheet 1
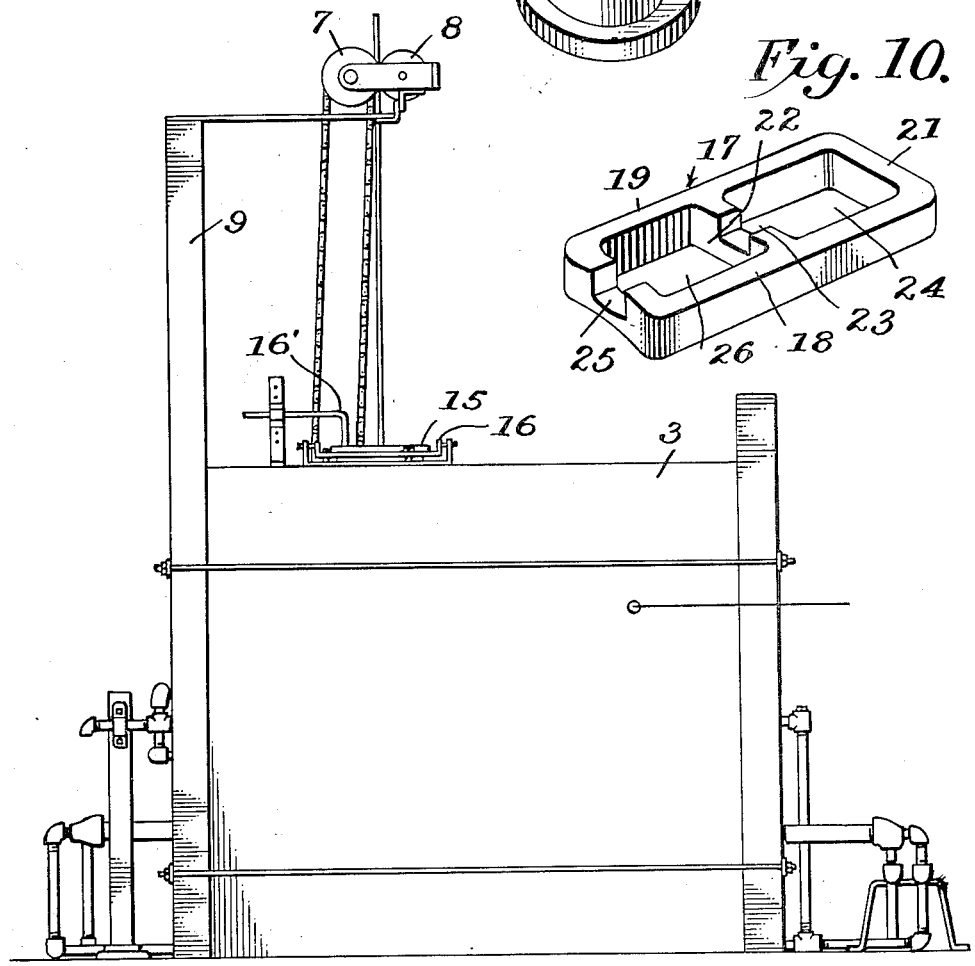
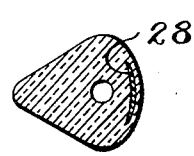
INVENTOR
WILLIAM J. WOODS.
BY
ATTORNEY Oct. 27, 1931.  W. J. WOODS  1,829,429
DRAWING GLASS
Filed April 9, 1929  4 Sheets-Sheet 2
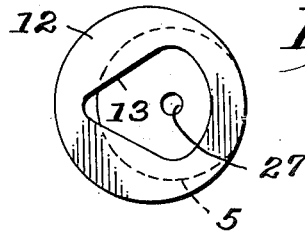
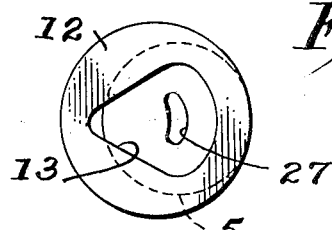
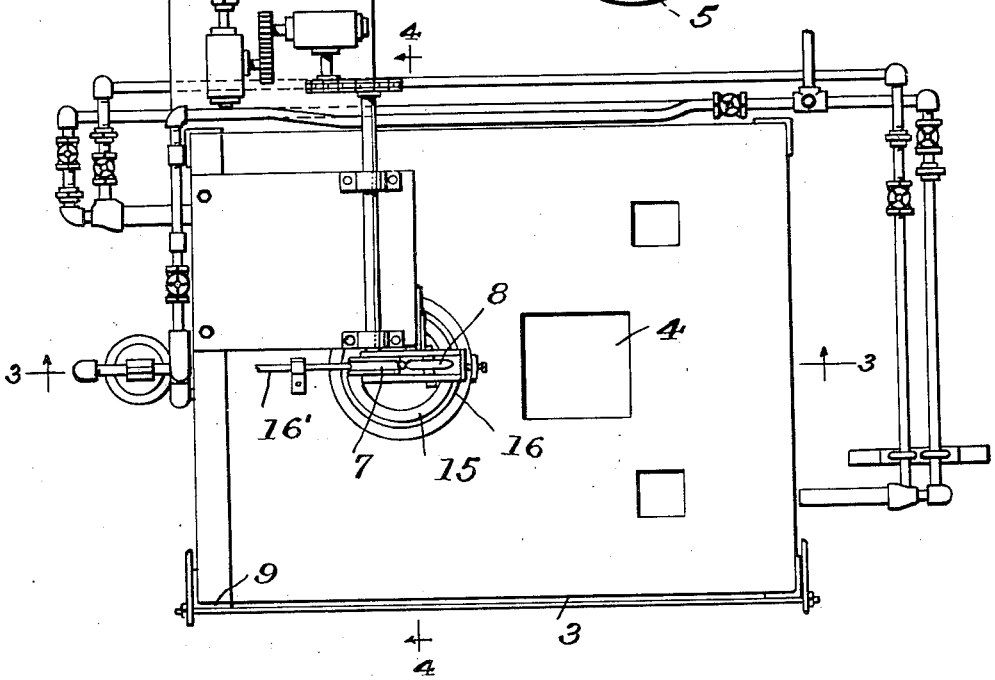
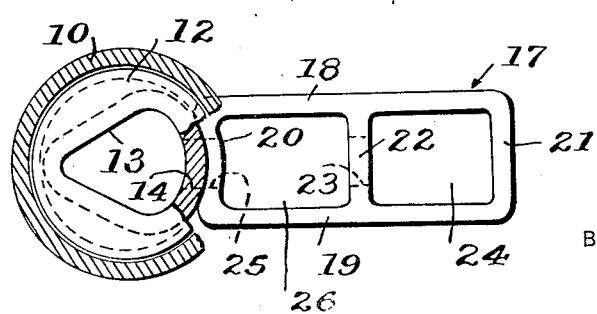
INVENTOR
WILLIAM J. WOODS.
BY
ATTORNEY Oct. 27, 1931.  W. J. WOODS  1,829,429
DRAWING GLASS
Filed April 9, 1929  4 Sheets-Sheet 3

INVENTOR
WILLIAM J. WOODS.
BY
ATTORNEY

Oct. 27, 1931.   W. J. WOODS   1,829,429
DRAWING GLASS
Filed April 9, 1929   4 Sheets-Sheet 4
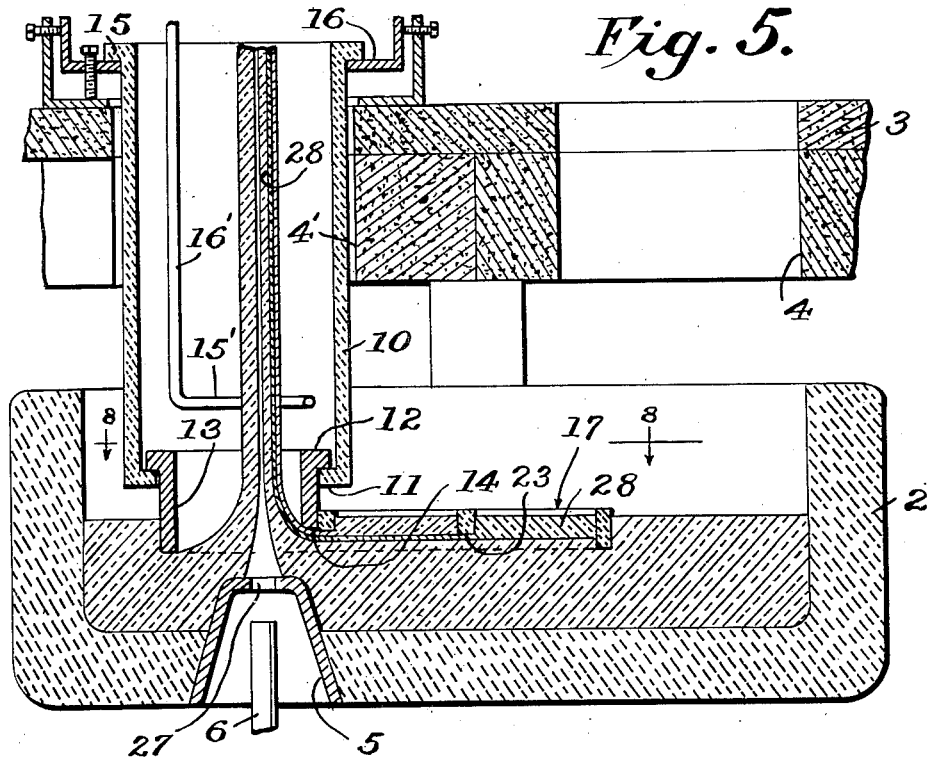
Fig. 5.
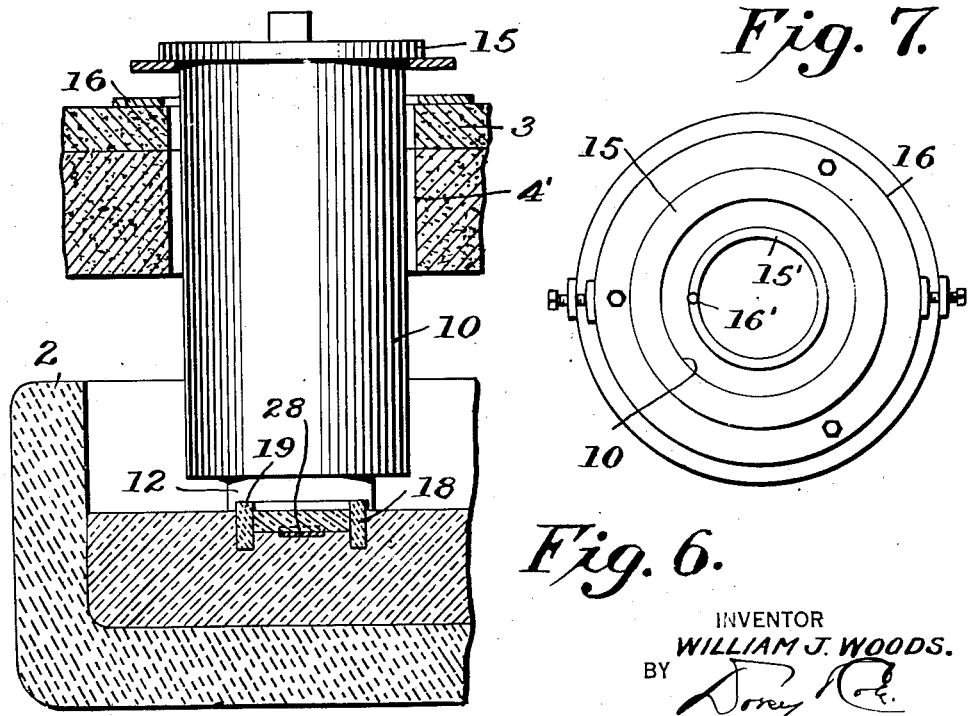
Fig. 6.
Fig. 7.
INVENTOR
WILLIAM J. WOODS.
BY
ATTORNEY Patented Oct. 27, 1931

1,829,429

UNITED STATES PATENT OFFICE

WILLIAM J. WOODS, OF CORNING, NEW YORK, ASSIGNOR TO CORNING GLASS WORKS, OF CORNING, NEW YORK, A CORPORATION OF NEW YORK

DRAWING GLASS

Application filed April 9, 1929. Serial No. 353,890.

This invention relates to a method of and means for producing drawn glass and more particularly to the production of small bore tubing with thick walls having a lens front and, if desired, a stripe of colored glass on its rear wall.

To accomplish these ends, I provide a cooled nipple immersed below the surface of molten glass and means by which the glass may be drawn from above the nipple. In connection with such drawing apparatus, I also provide a hollow shaping member immersed in the glass above the nipple through which shaping member the draw takes place so that the shape of the tubing is controlled by the shape of the shaping member. The invention also involves, when tubing having a colored stripe is to be made, the feeding of colored glass into the tube as the draw takes place and also the construction, combination, and arrangement of the several parts which will be hereinafter fully described and claimed.

In the drawings:

Fig. 1 is a side view in elevation of an apparatus embodying my invention and adapted to carry out the process herein disclosed;

Fig. 2 is a top plan view of Fig. 1;

Fig. 5 is a fragmentary sectional view similar to Fig. 3 illustrating the parts on a greatly enlarged scale;

Fig. 6 is an enlarged fragmentary sectional view similar to Fig. 4;

Fig. 7 is a top plan view of the boot and its supporting elements illustrated in Fig. 6;

Fig. 8 is a horizontal sectional view taken on the line 8—8 of Fig. 5;

Fig. 9 is an inverted perspective view of the shaper;

Fig. 10 is an inverted perspective view of the frame used for confining the colored glass;

Fig. 11 is a top plan view of the shaper showing beneath it a cooled nipple of the type used in the production of tubing having a circular bore;

Fig. 12 is a view similar to Fig. 9 illustrating the type of nipple used in the production of tubing having a flat bore; and Fig. 13 is a sectional view through a lens front striped tube, such as may be produced by my improved method and apparatus.

Figure 3:
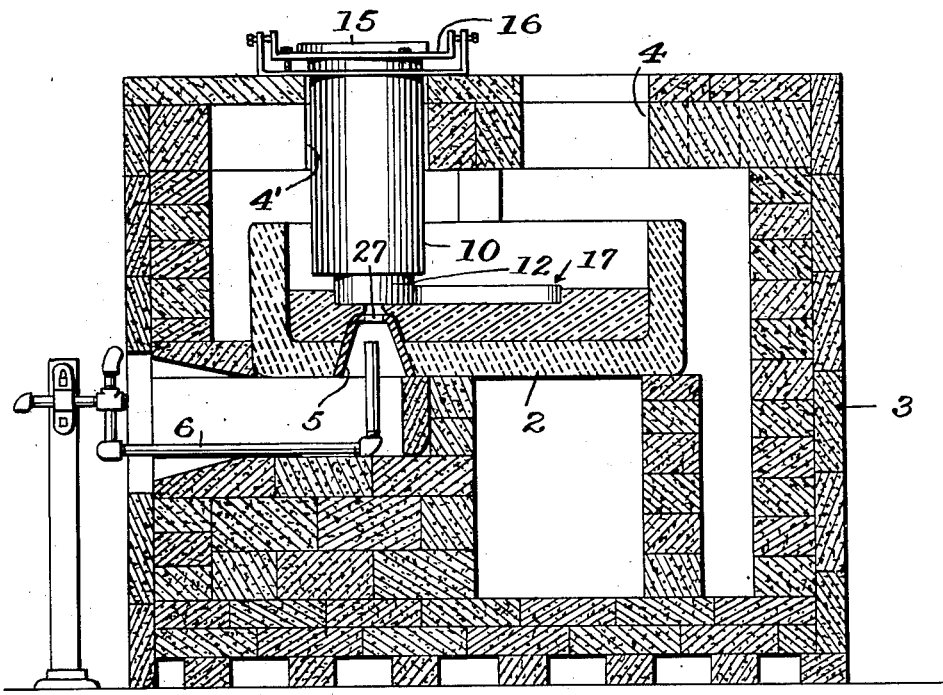
Fig. 3 is a vertical sectional view taken on the line 3—3 of Fig. 2, the superstructure being omitted.
Figure 4:
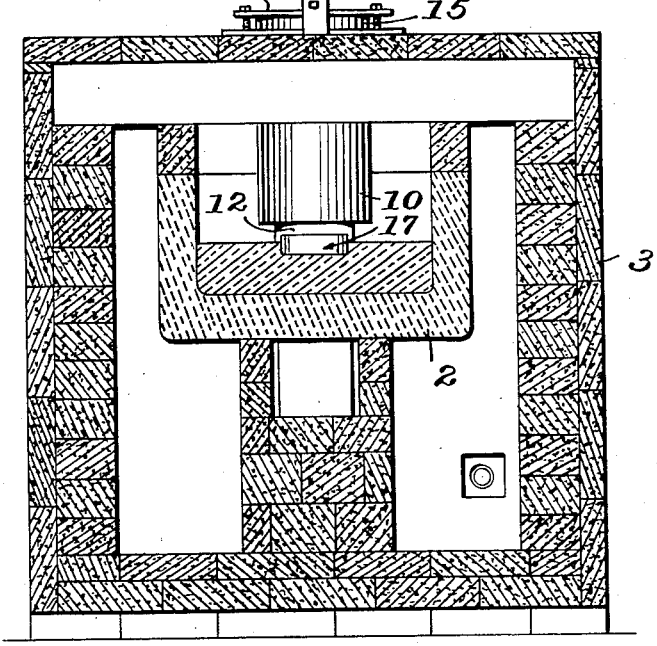
Fig. 4 is a transverse sectional view taken on the line 4—4 of Fig. 2, the superstructure being omitted.

The bath of glass from which the tubing is drawn, is, by preference, contained within a suitable basin or tank 2, which, in turn, is contained within a suitable heating structure 3. In the form shown, the bath is one which is adapted to be replenished from time to time by ladling fresh glass therein, the glass being fed to the basin through the opening 4 in the top of the heating structure. Inserted upwardly in the bottom of the basin 2 is a nipple 5 which arises within the glass within the basin but which preferably, as shown, does not extend above the surface of the bath. This nipple is hollow and is adapted to be cooled to a desired extent by means of an air induction pipe 6.

Located above the top of the structure 3 and mounted on a frame 9, is a drawing mechanism comprising a grooved wheel 7 and cooperating edged wheel 8 which is driven in any suitable manner and at a desired speed. Formed in the heating structure 3 directly above the nipple 5 is an opening 4' through which a boot 10 is introduced into the basin 2. The lower edge of the boot 10 is positioned slightly above the glass in the basin and is provided with an inturned flange 11 for a purpose to be more fully hereinafter described.

Supported on the inturned flange 11, at the lower edge of the boot 10, is a shaper 12 which, in the manufacture of lens front tubing, has a triangular portion 13, the lower edge of which is immersed below the surface of the glass. This shaper is preferably made of a heat resisting alloy not subject to attack by molten glass. The boot 10 extends upwardly through the opening 4' in the top wall of the furnace structure and is provided at its upper end with an out-turned flange 15 which rests upon a vertically adjustable ring 16 which is also shiftably mounted on the furnace structure so as to vary the axial relation between the shaper 12 and the nipple 5. In order to provide the necessary control of the tubing being drawn, I preferably introduce into the boot around the tubing a ring shaped pipe 15' which is perforated at intervals and is connected to an air supply line 16' whereby the temperature conditions within the boot may be varied as the draw takes place.

In the operation of the device as above described, glass having been put into the basin until its level is above the lower edge of the shaper 12, the drawing of glass is started by immersing the end of a bait in the glass over the nipple and drawing this upwardly until the resultant column of glass is threaded between the feed rolls 7 and 8, which are in rotation to continue the draw. It will be found that the shaper serves to give the desired cross sectional shape to the resultant body of glass, the drawing taking place from the cooled glass over the nipple and within the shaper. If it is desired to fabricate tubing, the head of the nipple is provided with an opening 27 through which air is admitted into the interior of the body of glass being formed.

By shifting the position of the drawing rolls 7 and 8 laterally, the position of the bore within the tube may be varied, and by shifting the shaper 12 axially in respect to the nipple, it will be found that the size of the bore in the resultant tubing may be varied, that is, the greater the separation between the nipple 5 and the shaper 12, the smaller will be the bore produced. Hence, I am enabled by my invention to mechanically produce lens front capillary tubing having bores of varying sizes.

In certain cases, it may be desirable to incorporate in the tubing a stripe of colored glass which, in lens front tubing, is generally placed back of the bore. This, I find, may be accomplished by forming a cut away portion 14 in the lower edge of the shaper and laying a narrow layer 28 of colored glass upon the surface of the body of flint glass in the basin 2 adjacent to the cut away portion. During the drawing, this colored glass will move into the cut away portion as a ribbon and be fed upwardly through the shaper during the drawing operation so that it forms a stripe of colored glass in the resulting tubing.

In order to preserve the relation of the colored glass striping in the tubing and guide the operator in supplying additional colored glass, a frame 17, having its lower edge submerged below the level of the glass in the tank 2, is employed. This frame is formed of a suitable refractory material preferably having a specific gravity less than the bath of glass and consists of a pair of side walls 18 and 19 connected at one end by a curved wall 20, which is adapted to fit the curvature of the back of the shaper, while the opposite ends of the walls 18 and 19 are connected by a transversely extending wall 21. A partition wall 22 is arranged intermediate the ends of the walls 18 and 19 and the lower edge of this partition wall is cut away as at 23 to facilitate the flow of the glass from the chamber 24 formed between the wall 21 and the partition wall toward the point of draw. The latter is only employed when it is desired to draw tubing having a colored back overlaid with flint or a glass of another color. The curved wall 20 is also cut away at 25 so that its lower edge registers with the lower edge of the cut away portion 14 of the shaper 12 to facilitate the flow of the glass from the chamber 26 toward the point of draw. In order to secure tubing having a colored back, colored glass is introduced into the chamber 24 and floated on the surface of the clear glass in the basin 2, and clear glass is introduced into the chamber 26. As the draw takes place, the glass in the chamber 24 will be drawn along the surface of the glass in the basin 2 toward the point of draw and the clear glass in the chamber 26 will also be drawn over the surface of the colored glass toward the point of draw. In this manner, the tubing which is being drawn will have a laminated back consisting of colored and clear glass, with the clear glass surrounding the colored glass. See Fig. 13.

As the cut away portion of the shaper is opposite the V-shaped portion thereof, the stripe will be magnified when the tubing is viewed through the lens front behind the bore.

In this specification and claims, "flint" and "colored" glass are used to designate any two glasses capable of being cojointly drawn.

Having thus described my invention, what I claim as new and desire to secure by Letters Patent is:

1. The hereinbefore described method of making drawn glass which comprises forming a horizontally narrow layer of colored glass in a bath of flint glass and drawing upwardly from such two glasses.

2. The hereinbefore described method of drawing glass having a colored stripe which comprises forming a relative narrow layer of colored glass in a bath of flint glass and conjointly drawing the two glasses upwardly through a shaping element projecting into the glass.

3. The hereinbefore described method of upwardly drawing glass which comprises forming a narrower layer of colored glass in a bath of the flint glass and drawing the colored glass beneath an element immersed in the glass.

4. The hereinbefore described method of making drawn capillary glass tubing which comprises drawing glass upwardly from a bath of molten glass and over a cooling nipple located below the surface of the bath.

5. In an apparatus for drawing glass tubing, the combination with a container for a bath of molten glass, a nipple located in the bath, a shaper projecting into the bath above the nipple and means for drawing glass from the bath from within the shaper.

6. In an apparatus for drawing glass tubing, the combination with a container, for a bath of a molten glass, a nipple located in the bath, a shaper projecting into the bath above the nipple, means for shifting the shaper laterally in respect to the nipple, and means for drawing glass from the bath from within the shaper.

7. In an apparatus for drawing glass tubing, the combination with a container for a bath of a molten glass, a nipple located in the bath, a shaper projecting into the bath above the nipple, means for varying the immersion of the shaper in the bath and means for drawing glass from the bath from within the shaper.

8. In an apparatus for drawing glass tubing, the combination with a container for a bath of a molten glass, a nipple located in the bath, a shaper projecting into the bath above the nipple, means for shifting the shaper laterally in respect to the nipple and vertically in the bath and means for drawing glass from the bath from within the shaper.

9. In an apparatus for drawing glass tubing, the combination with a container for a bath of a molten glass, a nipple located in the bath, a shaper projecting into the bath above the nipple, the lower edge of the shaper having a restricted cut away portion, and means for drawing glass from the bath from within the shaper.

10. In an apparatus for drawing glass tubing, the combination with a container for a bath of a molten glass, a nipple located in the bath, a shaper projecting into the bath above the nipple, the lower edge of the shaper having a restricted cut away portion, means for shifting the shaper laterally in respect to the nipple, and means for drawing glass from the bath from within the shaper.

11. In an apparatus for drawing glass tubing, the combination with a container for a bath of a molten glass, a nipple located in the bath, a shaper projecting into the bath above the nipple, the lower edge of the shaper having a restricted cut away portion, means for varying the immersion of the shaper in the bath and means for drawing glass from the bath from within the shaper 12. In an apparatus for drawing glass tubing, the combination with a bath of a molten glass, a nipple located in the bath, a shaper projecting into the bath above the nipple, the lower edge of the shaper having a restricted cut away portion, means for shifting the shaper laterally in respect to the nipple and vertically in the bath, and means for drawing glass from the bath from within the shaper.

13. In an apparatus for drawing glass tubing, the combination with a container for a bath of a molten glass, a nipple located in the bath, a shaper projecting into the bath above the nipple, the lower edge of the shaper having a restricted cut away portion, a frame projecting into the bath and having its side walls disposed near the ends of the cut away portion of the shaper and means for drawing glass from the bath from within the shaper.

14. In an apparatus for drawing glass, the combination with a container for a bath of molten glass, means for drawing glass from the bath, means submerged below the surface of the glass for shaping it as it is drawn and means for cooling that portion of the glass from which the draw takes place, of a frame within the container for receiving glasses of a different character and retaining them in a restricted zone on the surface of the glass bath in such a position that when the draw takes place all glasses will be drawn simultaneously.

WILLIAM J. WOODS.